April 23, 1968   H. JUDIN   3,379,832
MICRO-OPTICAL SCANNING APPARATUS
Filed Dec. 18, 1964   2 Sheets-Sheet 1

INVENTOR
HERBERT JUDIN
BY Misegades & Douglas
ATTORNEYS

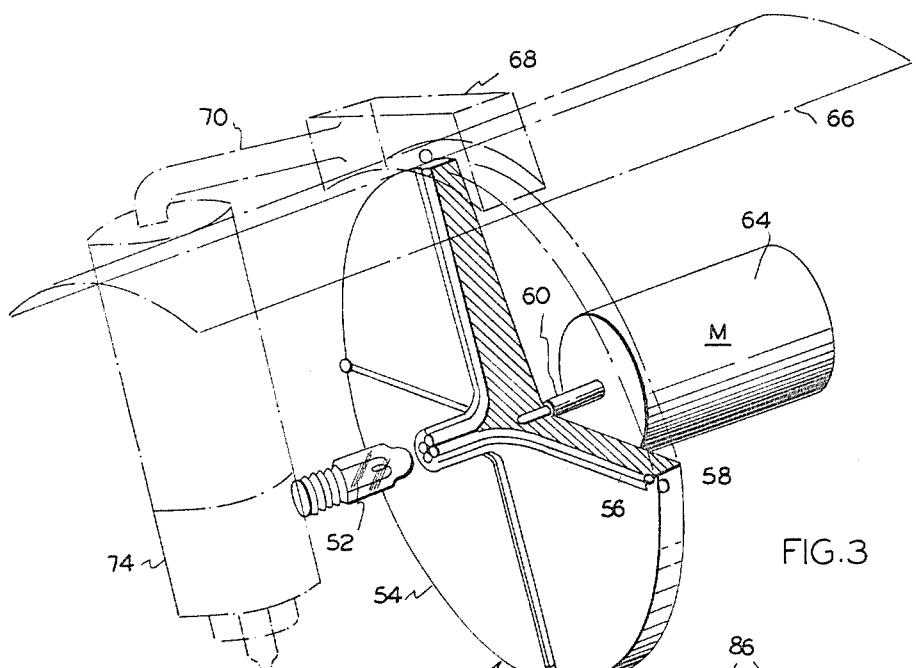
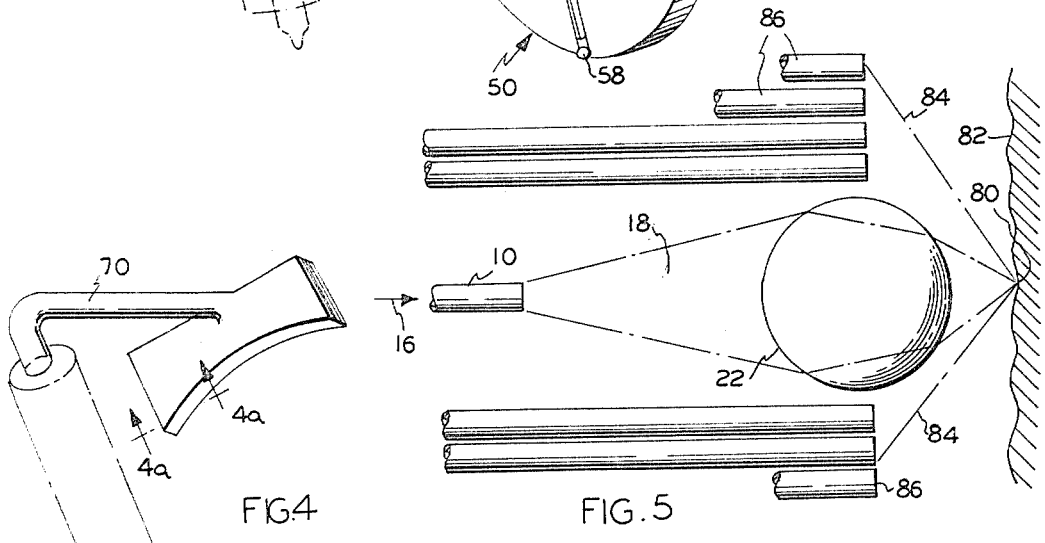
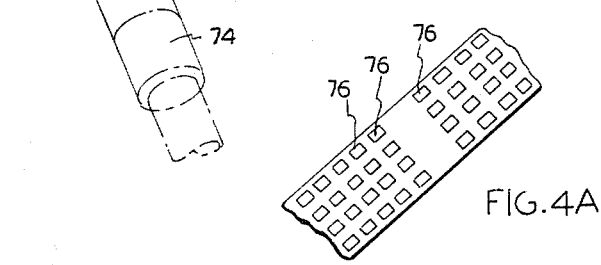

3,379,832
MICRO-OPTICAL SCANNING APPARATUS
Herbert Judin, R.F.D. 6, Dix Hills,
Huntington, N.Y. 11743
Filed Dec. 18, 1964, Ser. No. 419,512
11 Claims. (Cl. 178—7.6)

ABSTRACT OF THE DISCLOSURE

A high speed, diffraction limited point or line forming apparatus utilizing imperfect, uncorrected converging lens elements substantially hemispherical, spherical or cylindrical in shape, in conjunction with electromagnetic radiation incident upon said lens elements with limited beam divergence angles.

By virtue of the incident rays passing through small optical paths, the diffraction limited effect takes place with imperfect uncorrected optical elements of appropriate dimensions.

A scanning apparatus comprising such uncorrected converging lens elements (singly or in multiple array), an optical fiber bundle or single fiber as a light pipe radiation source, and means of rotating or translating the fiber and spherical lens combination to trace a focused radiation point across a surface. Application of the above phenomenon over the electromagnetic range encompassed by ultraviolet, infrared and visible light and extending into millimeter waves using broadband (thermal) or monochromatic (laser, diode emitter or other spectral) sources of radiation.

---

The present invention relates to improved micro-optical scanning apparatus and more particularly relates to the method and apparatus for point light source formation, scannning and micro-probe operations.

The invention is particularly concerned with lens means disposed to primary utilization of diffraction limited production of images, such lens means receiving light from optical fibers disposed at the source-side of said lens means, wherein the refraction phenomena of the light passing the lens means and the lens means are of such dimensions that diffraction phenomena prevails when the incoming ray angles are of limited divergence.

By means of the present invention, there is provided a method and apparatus for producing ultrafine light points of high intensity and circular symmetry. The apparatus of the invention contemplates using ordinary incandescent light, and there is produced from such light by means of the invention a control point beam approaching micron dimensions formed from optical fibers in the order of 60 microns.

It has further been found that by use of photoelectric scanning tests on film and glass media patterns resolving powers well beyond 100 line pairs per mm. have been demonstrated. The beam forming technique of the invention is not limited by usual optical design parameters which involve the presence of both spherical and chromatic aberrations. Diffraction considerations show that sub-micron light points are possible in the practice of the present invention, thus the use of laser and other spectral sources predict resolution capabilities of over 500 line pairs per mm. Applications of embodiments of the present invention contemplates use in flying spot scanners, micro-densitometers, metallurgical studies of surface roughness or graininess, particle density, and the like, medical studies such as cytoanalysis, video recording and optical data processing including radar pulse analysis, nuclear emulsion measurements, and the invention is also applicable to the field of facsimile transmission reception and photographic reproduction.

An object, therefore, of the present invention is to provide method and apparatus for the generation of a minute and intense symmetrical spot of light by diffraction limited means. The invention concerns the use of optical fibers in combination with a small ball of glass, or significant section thereof, acting as a diffraction limited lens. By this means, there is produced a unique light point that may be employed in any of a variety of practical applications, and the point light source of the invention can be made to approach a 1 micron diameter, which is proximate to 0.000040 inch in size. The fiber-ball combination of the invention may be used in a stationary state or in motion with respect to the object being scanned, whether it is a film slide, or opaque surface having attendant reflection or transmission capabilities and may be also used with beam pick-up means or photoelectric means.

In the practice of the present invention, the apparatus for producing the light point is by means of the wave aspects of diffraction rather than the usual geometric properties or ray aspects of the ball focus mechanism, and the customary need of corrective optical design measures is eliminated. The use of a substantially spherical lens is ordinarily expected to produce a light spot diameter of a few thousandths of an inch and involves the disadvantages of spherical and chromatic aberration. But when a high quality ball of glass is used and where the ball is a glass sphere of sufficiently small size, the diffraction properties prevail and the resulting spot size is far less than geometrically determined. In the practice of the present invention, a glass ball need not be truly spherical within any large range of tolerance, and therefore it may be aspheric of any non-uniform curvature, and may be even egg-shaped, or simply a hemispherical section of a ball. The glass ball need not be optically centered or in alignment with the incident beam produced from a fibre tube within any large range of tolerance. The object light source also need not be circular or symmetrical, nor need it be of homogeneous light brightness within extremely wide discrepancies. The light source used with the present invention need not be of monochromatic nature, and thus broadband white light may be used as well. The invention contemplates the use of two or more glass balls arranged in series array for producing still smaller light point diameters approaching the actual light wavelength dimension.

A further object of the invention, therefore, is to provide for the generation of unique light spots whose point forming technique is not limited by usual optical design parameters and is significantly independent of both spherical and chromatic aberrations.

A further object is to provide a system convenient to adjust, align, and simple to manufacture.

A further object is to provide a system of almost weightless construction, high speed operation, very small size and comparatively little cost.

A further object is to provide a system whose signal-to-noise output ratio is much improved due to easy control of light spot formation and to the elimination of extraneous or stray light by masking as required—reduces effects of stray light to a negligible amount.

A further object is to take the place of long optical path systems by a very short path high speed imaging device (f-number less than 1).

A further object is to scan curved film along a straight line segment or scan a planar film circularly for coded information transmission.

Another object of the present invention is to provide means for the formation of light point sources in which glass balls or beads of various sizes up to several millimeters in diameter are provided in combination with single or multiple strand fibers which may have irregular cross-sections up to the order of ¼ mm. for white light. The structural symmetry and uniformity of curvature of the balls may be ignored, even though there is produced a high quality of circular light points. The use of Gaussian relations in which there are paraxial rays for the fiber-ball system produces in accordance with the invention a solitary circular point image not accompanied by any conventional diffraction ring pattern when used with apodization.

In understanding the invention, it should be understood that at least in one form thereof the invention is seen as well to relate to the use of uncorrected converging lenses in spherical, cylindrical, hemispherical, hyperhemispherical, or lenticular forms, in combination with electromagnetic radiation, such as from lasers, diode emitters, or other spectral sources, to produce the phenomena of diffraction limited point or line images. This phenomena is peculiar in size and form, as has been well described herein. It is possible that a stronger point may be made by referring to the use of spherically and chromatically uncorrected converging lenses. Use of an uncorrected optical element, such as a residually under-corrected converging lens to produce the previously discussed diffraction limited image formation is therefore also contemplate.

The invention is an improvement and departure from the prior art, the prior art being primaily that which is disclosed in "Applied Optics and Optical Design," pages 119, 120, 126, 127, 135, and 140, A. E. Conrady, Dover, 1957 (vol. I) and 1960 (vol. II); "Fiber Optics Yields a New Scanner Concept," R. G. Day and D. M. Krauss, "Controlled Engineering," December 1961; U.S. Patent 3,036,153 to R. G. Day; and "Ultimate Point Light Source Using Fiber Optics," H. Judin, Journal of the Optical Society of America, vol. 54, November 1964, p. 1396, TB 16.

The term "ball" or "bead" or "spherical element," as used, includes a body of refractive liquid or plastic or transparent material performing the function or acting as a lens. As to the term "optical fiber" as is used herein in its generic significance, it includes light pipes, and all of the now well known electromagnetic radiation conveying means and the like. The term "apodizing" embraces within its scope refractive coatings of material of varying thicknesses acting as light obstruent or light phase-effecting media.

The above and other objects and advantages of the invention will become apparent from the full consideration of the following detailed description and accompanying drawings in which.

Figure 2:
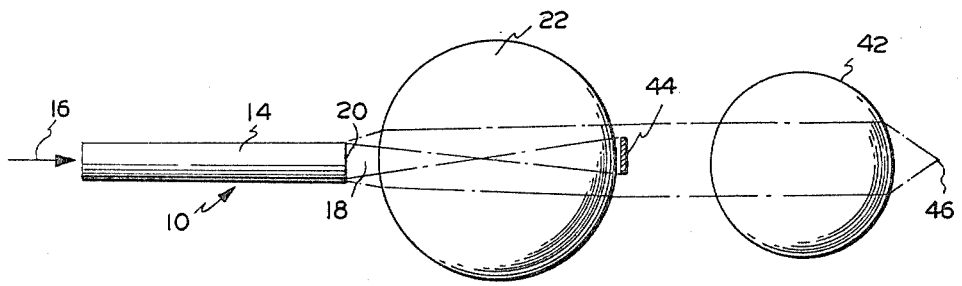
Figures 6, 7A:
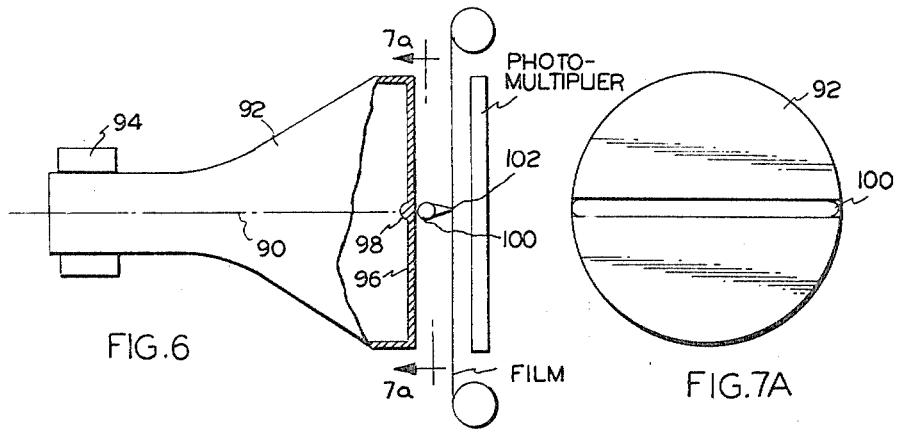

FIGURE 2 is a schematic illustrating and representation of a series arrangement of two glass balls in which light from a fiber element is received by the first ball and the light therefrom is near collimated or made less divergent for a second ball, and in which a mask is used to eliminate extraneous or wide angle divergent light from being emitted further, in accordance with an embodiment of the invention;

FIGURE 3 is a partially cross-sectional view showing in perspective a preferred embodiment of the fiber-ball scanning apparatus of the present invention;

FIGURE 4 shows in generally prespective arrangement an optical fiber bundle collector used in conjunction with the present invention;

FIGURE 4A shows an enlarged view of a layer in cross-section taken along lines 4a—4a of FIGURE 4;

FIGURE 5 shows a modification of the present invention in which a coaxial arrangement of fibers and focusing glass ball or balls provides a system using reflected and scattered light from a surface which is collected by an arrangement of peripherally disposed fibers for transporting the collected light to a photoelectric sensor;

FIGURES 6 and 7A are schematic representations of a modification of the invention in which a cathode ray tube is provided with a phosphor coated glass element in conjunction with a glass fiber acting as a cylindrical lens to provide a diffraction limited effect upon an image receiving means, in accordance with another modification of the invention.

Figure 1:
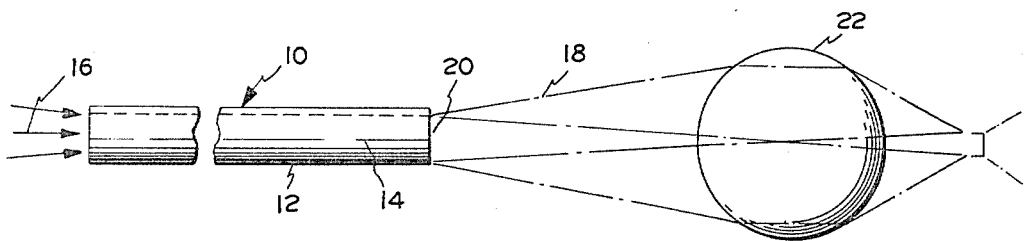
FIGURE 1 is a generally schematic representation of the fiber-ball combination contemplated in the practice of the preferred embodiment of the present invention.

Referring now to the drawings, there is shown in FIGURE 1, an optical fiber 10 having a clad 12 peripherally disposed about the cylindrical surface of said optical fiber, and a core 14 constructed of material for the transmission and illumination of a light beam 16 being applied thereto and for producing an exit beam 18 from the exit aperture 20. The exit beam 18 is intercepted by a small or tiny glass ball 22 of substantially spherical contour. The ball is disposed adjacent, or substantially and immediately adjacent, the exit end of the fiber 10 so that the exit beam will produce diffraction limited phenomena which predominates over the resulting refraction phenomena as a result of using imperfect, non-corrected, optical components of small dimensions, said dimensions of the components being closer to the wavelength of light dimensions with the incoming ray angles approaching the paraxial region.

Figure 1A:
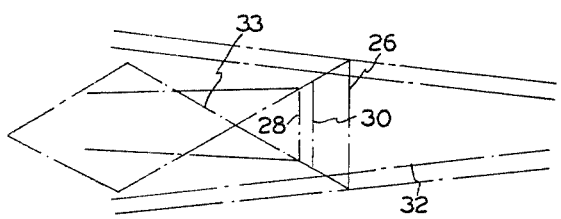
FIGURE 1A is an enlarged diagram of a portion of FIGURE 1.

FIGURE 1A shows that the glass ball produces spherical aberration, chromatic aberration, and diffraction, so that for broadband radiation or white light, when the glass ball 22 is above a certain size, preferably in the range of 2 to 3 mm. diameter, (as dependent upon incoming light beam divergence angle (or larger, then the spherical and chromatic aberrations limit the resulting light point dimensions to that shown in FIGURE 1A as image 26. However, the single and simple geometrically related image size is shown as image size 28, being equal to the object size or core of fiber 14 times the image distance divided by the object distance, or $I=O \cdot Q/P$. In this case, the ball acts as an aberration limited converging lens with resultant image size 26 showing a common blur circle of relative confusion.

But where the glass ball 22 is of a dimension substantially below the certain sizes described above, and, for practical purposes, not smaller than about 1 mm., and if the fiber core exit aperture 20 is beyond a certain distance separation from the ball, that is, over 3 mm. approximately, the image formed is diffraction limited and is the substantially perfectly circular image 30. Paraxially disposed rays 32 as well as marginally disposed rays 33 are also shown in FIGURE 1A. A number of accompanying diffraction rings will appear in which the visible number thereof depends upon the separation distance between the exit aperture 20 and the ball 22, as well as other known factors. The phenomenon is also a function of the divergence angle of the beam incident upon the spherical element. Thus if a normally low divergence angle laser beam is used, an optical fiber transport may not necessarily be required and the values of all dimensions cited above for white light no longer apply. Thus, a laser beam directly incident upon an uncorrected ball element of perhaps up to 8 or 10 mm. diameter can suffice to produce the same effect. In this case, spurious spherical aberration will be obvious as a halo surrounding a highly intense point center due to multiple internal reflections within the base.

FIGURE 2 is an embodiment in which there is provided an arrangement of two glass balls 22, 42 in series alignment along the paraxial axis, and in which the first ball 22 acts as a ball 22 light beam converges, while the ball 22 has a mask over and adjacent the central portion of the beam. Said mask 44 is disposed to shield the extraneous light from murther transmission. The lateral portions of the ball 22, taken with respect to the axis provided by the passage of the beam therethrough, may also be shielded so that extraneous light is not emitted therefrom. Gaussian conditions are thus produced so that it is possible to obtain a finer point light source. Thus a smaller angular divergence of the incident light is passed onto ball 42. Thus a light source of beam 16 provides for the transmission of light to the fiber 14, whose exit core aperture 20 is placed at or near the aplanatic or focal point of ball 22, and the fiber 14 is also clad or shielded, as described in connection with FIGURE 1.

The final point image 46 of the beam transmitted from ball 42 is substantially devoid of rings when apodization is applied. This is a Gaussian image point as produced by imperfect optical elements which are diffraction limited rather than geometrically limited, that is by diffraction rather than refraction phenomena. It is therefore noted that use of apodization techniques may be employed to increase light concentration of central image pattern, effectively limiting the formation of Airy ring patterns.

There is shown a more particular embodiment and application of the principles of the invention in FIGURE 3, and the fiber-ball scanning arrangement 50 is provided to include a lens lamp source 52, a rotating disc or element 54 in which are mounted a plurality of fiber elements 56 that terminate at peripheral portions of the disc so that the light from the fiber elements 56 pass through minute glass balls 58, 58. The disc 54 is mounted on an axial 60 for rotation by a motor 64 that is synchronously driven and separately energized (not shown).

Over a portion of the peripheral surface of the disc 54 is a film 66 that moves along its longitudinal direction so that as the disc 54 rotates, the light passing from the lamp 52 and as transmitted by the fiber elements 56 and the balls 58, 58, respectively, scan and provide modulation of the light beam as it passes through the film 66 and is received by a optical fiber bundle collector 68. The collector 68 is more particularly shown in FIGURES 4 and 4A, and contains multiple layers of fiber optics and consequently the light received in the collector is accordingly translated over collector means 70 so that a multiplier phototube 74 receives and amplifies the light that is applied thereto. FIGURE 4A shows that there may be a multiplicity of fiber ends 76, 76, 76, that are disposed for receiving the light as it is modulated and received after passing the film 66.

In FIGURE 5, there is shown an arrangement in which light 16 from a source is applied to a fiber element 10 to produce exit beam 18 which is applied to a glass ball or diffraction limited lens means 22, to produce therefrom a substantially point image 80, as has been previously described herein. The point 80 is applied to a specimen surface 82 that tends to reflect and scatter light as shown in beams 84, 84, so that they are received and collected by an arrangement of concentric fibers 86, 86, circumferentially arranged about glass fiber 10 and are coaxial or substantially coaxial therewith. The exit ends of the fibers 86, 86 direct the exit beam onto a photoelectric sensor element (not shown).

There is shown a further embodiment in FIGURE 6 in which a cathode ray tube is provided as a translative element for a beam 90, the cathode ray tube 92 having the conventional yoke 94 for deflecting the beam or rotating it, as is well known. The beam is received by a screen 96 which contains a phosphor coated surface, as exemplified by the curved glass body section 98 in the vacuum side of the screen 96. A cylindrical rod or glass fiber 100 (which may have a clad coating if desired) is positioned in alignment with the selected phosphor section of the screen 98 and secured outside of the cathode ray tube to produce a selectively focused fine line of light. This effects a demagnification of the phosphor emitted light line thickness which may be diffraction limited or not as dependent upon the dimension of the cylindrical rod (cross-section) and its separation from section 98, discussed above.

The beam 90 is controlled to translate by the yoke 94 and attending circuitry (not shown) to provide a line scan across section 98 so that the light output collected by the rod 100 is focused at point 102 and translated along a line perpendicular to the plane of the paper. Coincident with the line extending through point 102, as described, is a film strip originating from magazine spools 103, which is thereby scanned line-by line as the film is transported from spool to spool. For fascimile transmission of picture detail on the scanned film (along line in point 102), a photomultipler tube, as schematically illustrated, is employed to convert the received light impulses to electrical signals.

It is within the contemplation of the present invention to provide an arrangement of a plurality of fibers so that the exit beams thereof are directed to a common glass ball or to a common cylindrical rod and by this arrangement the same diffraction limited effect appears, and the light point spot appears in different planes, so that it is possible to provide an arrangement wherein the light point spots are disposed in a curved surface or in perpendicular arranged planes which may be identified as the XY plane, the XZ plane, and the YZ plane.

The fiber-ball technique of the present invention may be found to take the place of conventional expensive, highly corrected, bulky and critically aligned microscope objectives or other highly corrected lens in providing axial point or line light sources. It is also within the scope of the present invention to use half balls of glass or portions of a sphere instead of the spherical glass elements, and where such half balls are used, the hemisphere may be arranged such that the diametrical plane receives the light, and the curved surface thereof provides the exit for the light beam passing therethrough.

The invention is capable of being utilized at megacycle rates, at high numerical apertures ($f$ numbers less than 1) as applied to video and sound recording systems, high density computer storage, printing plate manufacture, for use in laser systems, and other related and developmental devices.

While I have described and illustrated specific forms of the invention, it will be clear that variations thereof may be resorted to without departing from the true scope of the invention as defined in the appended claims.

What is claimed is:
1. A micro-optical scanning apparatus comprising:
    a rotatable member;
    a plurality of optical fibers disposed on said member and having adjacent axially extending portions and equi-angularly spaced radially extending portions;
    means for collectively illuminating the ends of the axially extending portions of said fibers;
    a converging lens disposed adjacent the other end of each of said fibers;
    and means for disposing an object to be scanned substantially in the image planes of said lenses.
2. The invention according to claim 1 wherein at least one optical fiber is disposed on said rotating member, said fiber having an axially extending portion and a radially extending portion.
3. The invention according to claim 1 wherein said lens means is defined as a portion of a spherical glass ball, said portion being at least greater than a hemisphere.
4. The invention according to claim 1 wherein said lens means is a hemisphere of glass having its diametrical plane substantially perpendicular to the path of the received light.
5. The invention of claim 1 wherein a mask is disposed in said beam path for limiting the extraneous light transmission to a sensor.
6. A micro-optical scanning apparatus comprising:
    a rotatable member;
    a plurality of optical fibers disposed on said member and having adjacent axially extending portions and equi-angularly spaced radially extending portions;

means for collectively illuminating the ends of the axially extending portions of said fibers;
a spherical glass ball disposed adjacent the other end of each of said fibers for converging the light beam emerging therefrom;
and means for disposing an object to be scanned substantially in a surface including the convergence points of said balls.

7. A micro-optical scanning apparatus comprising:
a rotatable member;
a plurality of optical fibers disposed on said member and having adjacent axially extending portions and equi-angularly spaced radially extending portions;
means for collectively illuminating the ends of the axially extending portions of said fibers;
a diffraction limited lens means disposed adjacent the other end of each of said fibers.
and means for disposing object to be scanned substantially in the image planes of said lenses.

8. The invention according to claim 7 wherein said diffraction limited lens means is of a size ranging substantially in diameter of about 1 to 3 mm.

9. The invention according to claim 7 wherein said diffraction limited lens means comprises an arrangement of a series of glass balls of a size ranging substantially in diameter of about 1 to 3 mm., and in which a first glass ball decreases the divergence of the incident light beam for the adjacent succeeding ball.

10. A micro-optical film-scanning apparatus comprising:
a rotatable member;
a plurality of optical fibers disposed on said member and having adjacent axially extending portions and equi-angularly spaced radially extending portions;
means for collectively illuminating the ends of the axially extending portions of said fibers;
a diffraction limited lens means disposed adjacent the other end of each of said fibers wherein diffraction phenomena predominates over refraction phenomena with an imperfect non-corrected optical component;
means for moving a film to be scanned past said lens;
means for actuating said film-moving means and rotating said member in synchronism, and photoelectric means responsive to the light transmitted through the film.

11. A micro-optical scanning apparatus comprising:
a rotatable member;
a plurality of optical fibers disposed on said member and having adjacent axially extending portions and equi-angularly spaced radially extending portions;
means for collectively illuminating the ends of the axially extending portions of said fibers;
a diffraction limited lens means disposed adjacent the other end of each of said fibers;
said lens being an imperfect, non-corrected optical component;
and means for disposing an object to be scanned substantially in the image planes of said lenses.

References Cited

UNITED STATES PATENTS

| | | |
|---|---|---|
| 3,125,013 | 3/1964 | Herrick et al. |
| 3,166,623 | 1/1965 | Waidelich _ _ _ _ _ _ _ _ _ _ _ 350—96 |
| 3,187,627 | 6/1965 | Kapany. |
| 3,210,468 | 10/1965 | Trott. |
| 3,210,597 | 10/1965 | Siegmund et al. |
| 3,225,137 | 12/1965 | Johnson. |
| 3,235,660 | 2/1966 | Treseder et al. |
| 3,345,460 | 10/1967 | Betts et al. |

ROBERT I. GRIFFIN, *Primary Examiner.*

JOHN W. CALDWELL, *Examiner.*

R. L. RICHARDSON, *Assistant Examiner.*